(12) United States Patent
Lu et al.

(10) Patent No.: US 12,198,328 B2
(45) Date of Patent: Jan. 14, 2025

(54) DEFECT DETECTION METHOD, ELECTRONIC DEVICE AND READABLE STORAGE MEDIUM

(71) Applicant: HON HAI PRECISION INDUSTRY CO., LTD., New Taipei (TW)

(72) Inventors: Chih-Te Lu, New Taipei (TW); Chin-Pin Kuo, New Taipei (TW); Wan-Jhen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 387 days.

(21) Appl. No.: 17/854,265

(22) Filed: Jun. 30, 2022

(65) Prior Publication Data
US 2023/0214989 A1     Jul. 6, 2023

(30) Foreign Application Priority Data
Dec. 31, 2021   (CN) .......................... 202111663831.3

(51) Int. Cl.
*G06T 7/00* (2017.01)
*G06T 7/90* (2017.01)

(52) U.S. Cl.
CPC ............... *G06T 7/001* (2013.01); *G06T 7/90* (2017.01); *G06T 2207/10024* (2013.01); *G06T 2207/30141* (2013.01); *G06T 2207/30148* (2013.01)

(58) Field of Classification Search
None
See application file for complete search history.

(56) References Cited

U.S. PATENT DOCUMENTS

2019/0095742 A1* 3/2019 Fujimori .................... G06T 7/50
2021/0374928 A1* 12/2021 Hida .................... G06F 18/2148

* cited by examiner

*Primary Examiner* — Ian L Lemieux
*Assistant Examiner* — Promotto Tajrian Islam
(74) *Attorney, Agent, or Firm* — ScienBiziP, P.C.

(57) ABSTRACT

A defect detection method applied to an electronic device includes determining, pixel difference values based a test sample image and positive sample images. A color difference threshold is determined according to positive sample images. Feature connected regions of the test sample image are generated according to the color difference threshold and pixel difference values. A first threshold is generated according to image noises of positive sample images. A target region is determined from the feature connected regions according to a number of pixel points in each feature connected region and the first threshold. Once a second threshold is determined according to defective pixel points of negative sample images, a detection result of a test sample is determined according to an area of the target region and the second threshold.

20 Claims, 4 Drawing Sheets

DEFECT DETECTION METHOD, ELECTRONIC DEVICE AND READABLE STORAGE MEDIUM

FIELD

The present disclosure relates to image processing technology, in particular to a defect detection method, an electronic device, and a readable storage medium.

BACKGROUND

In a current defect detection method, reasonable errors result in low accuracy of defect detection. Reasonable errors may include: slight chromatic aberration, and background noise that is generated when an image of a product is generated. Therefore, there is a room to improve it.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
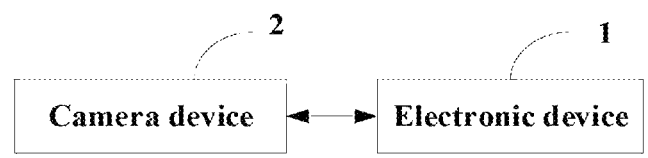
FIG. 1 shows an application environment of one embodiment of a defect detection method of the present disclosure.

As shown in FIG. 1, it is an application environment of one embodiment of a defect detection method of the present disclosure. A camera device 2 is communicated with an electronic device 1, and the camera device 2 may be a camera, or may be other devices for capturing images.

Figure 2:
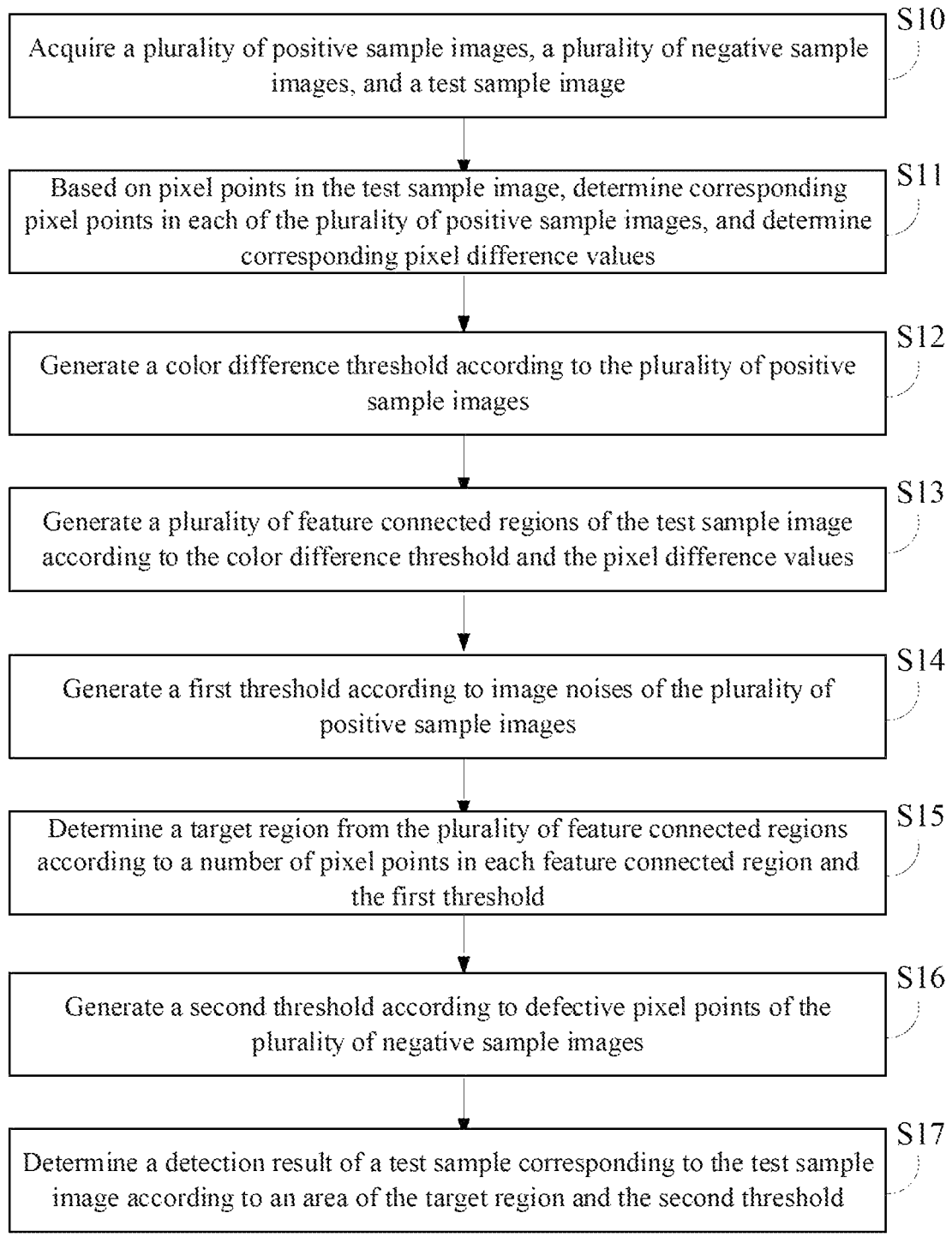
FIG. 2 is a flowchart of one embodiment of the defect detection method of the present disclosure.

As shown in FIG. 2, it is a flowchart of one embodiment of the defect detection method of the present disclosure. According to different requirements, a sequence of each block in this flowchart can be adjusted according to actual detection requirements, and some blocks can be omitted.

The defect detection method is applied to one or more electronic devices 1, and the electronic device 1 is a device that can automatically perform numerical calculation and/or information processing according to pre-set or stored instructions, and its hardware includes, but is not limited to, a microprocessor, application specific integrated circuit (ASIC), Field-Programmable Gate Array (FPGA), digital signal processor (DSP), embedded devices, etc.

The electronic device 1 can be any electronic product that can interact with a user, such as a personal computer, a tablet computer, a smart phone, a personal digital assistant (PDA), a game console, and an internet protocol television (IPTV), smart wearable devices, etc.

The electronic device 1 may also include network equipment and/or user equipment. Wherein, the network device includes, but is not limited to, a single network server, a server group formed by a plurality of network servers, or a cloud formed by a large number of hosts or network servers based on cloud computing.

The network where the electronic device 1 is located includes, but is not limited to, the Internet, a wide area network, a metropolitan area network, a local area network, a virtual private network (VPN), and the like.

At block S10, the electronic device acquires a plurality of positive sample images, a plurality of negative sample images, and a test sample image.

In at least one embodiment, each of the plurality of positive sample images is an image of a positive sample (i.e., a sample without defect). The plurality of positive sample images can be used to calculate a color difference threshold and a first threshold, and a calculation process will be described in detail below.

In at least one embodiment, each of the plurality of negative sample images is an image of a negative sample (i.e., a sample with defects). The plurality of negative sample images can be used to calculate a second threshold, and a calculation process will be described in detail below.

In at least one embodiment, the test sample image refers to an image of a test sample (i.e., a sample to be tested). By using the defect detection method, it can be determined whether the test sample is defective or defective-free by identifying and analyzing the test sample image.

In at least one embodiment, the sample in question may refer to a kind of product such as a computer peripheral equipment, a printed product, or any other suitable object such as a jar used for containing juice.

In at least one embodiment, the electronic device acquires the plurality of positive sample images by controlling the camera device to capture at least one image of each of a plurality of positive samples at a position and an angle; acquires the plurality of negative sample images by controlling the camera device to capture at least one image of each of a plurality of negative samples at the position and the angle; and acquires the test sample image by controlling the camera device to capture an image of the sample to be detected at the position and angle, wherein the plurality of positive sample images, the plurality of negative sample images and the test sample image have the same shape and size.

In other words, the electronic device can acquire the plurality of positive sample images, the plurality of negative sample images, and the test sample image by respectively controlling the camera device to capture at least one image of each of the plurality of positive samples, each of the plurality of negative samples, and the sample to be tested at the same position and angle.

At block S11, based on pixel points in the test sample image, the electronic device determines corresponding pixel points in each of the plurality of positive sample images, and determines corresponding pixel difference values.

In at least one embodiment, the pixel difference value refers to a difference value between a pixel value of the pixel point in the test sample image and a pixel value of the corresponding pixel point in each of the plurality of positive sample images. That is, the pixel difference value represents a difference value between the pixel values of two corresponding pixel points. The pixel point in the test sample image and the corresponding pixel point in the positive sample image have the same position.

In at least one embodiment, the electronic device determines the pixel difference value by: acquiring the pixel value of the pixel point in the test sample image as a first pixel value, and acquiring the pixel value of the corresponding pixel point in the positive sample image as a second pixel value; obtaining the pixel difference value by calculating a difference value between the first pixel value and the second pixel value.

At block S12, the electronic device generates a color difference threshold according to the plurality of positive sample images.

In at least one embodiment, the color difference threshold refers to a maximum number of pixel points corresponding to noise in the plurality of positive sample images, and is used to distinguish target pixel points and background pixel points in the test sample image.

In at least one embodiment, the generating of the color difference threshold according to the plurality of positive sample images includes:

Obtaining color difference values by performing a subtraction processing on pixel values of corresponding pixel points in each two positive sample images of the plurality of positive sample images; counting a number of pixel points corresponding to same color difference value in the plurality of positive sample images; generating a color difference histogram by using each color difference value as an abscissa and using the number of pixel points corresponding to the each color difference value as an ordinate; selecting a plurality of continuous color difference values from coordinate values in the color difference histogram according to a preset value (the number of pixel points corresponding to each color difference value of the continuous color difference values being greater than the preset value); obtaining a plurality of feature sets by determining continuous color difference values that are continuous with each other as a same feature set; counting a number of elements in each feature set; determining the feature set with a largest number of elements as a target color difference value set; and selecting a maximum color difference value from the target color difference value set as the color difference threshold.

Wherein, the pixel points in the plurality of positive sample images include noise pixel points and background pixel points.

The preset value can be set according to requirements, which is not limited in this application.

For example, when the preset value equals 0, the number of pixel points corresponding to color difference value 0 in the histogram equals 2, the number of pixel points corresponding to color difference value 1 equals 3, the number of pixel points corresponding to color difference value 2 equals 4, the number of pixel points corresponding to color difference value 3 equals 5, the number of pixel points corresponding to color difference value 4 equals 2, the number of pixel points corresponding to color difference value 5 equals 3, the number of pixel points corresponding to color difference value 6 equals 0, the number of pixel points corresponding to the value 7 equals 1, the number of pixel points corresponding to the color difference value 8 equals 2, the number of pixel points corresponding to the color difference value 9 equals 2, and the number of pixel points corresponding to the color difference value 10 equals 0, then the electronic device obtains a feature set A={color difference value 0, color difference value 1, color difference value 2, color difference value 3, color difference value 4, color difference value 5} and obtains a feature set B={color difference value 7, color difference value 8, color difference value 9}, the number of elements contained in the feature set A is greater than the number of elements contained in the feature set B, so the electronic device sets the feature set A as the target color difference value set, and determines the maximum color difference value in the feature set A i.e., the color difference value 5 as the color difference threshold.

Specifically, the coordinate value includes an ordinate value and an abscissa value, and the "selecting a plurality of continuous color difference values from coordinate values in the color difference histogram according to a preset value; obtaining a plurality of feature sets by determining continuous color difference values that are continuous with each other as a same feature set" includes:

Comparing each ordinate value with the preset value; obtaining a plurality of color difference values by selecting each abscissa value corresponding to an ordinate value that is greater than the preset value (as mentioned above, the abscissa value is the color difference value;

Obtaining a plurality of feature sets by selecting continuous color difference values that are continuous with each other from the plurality of color difference values as a same feature set.

Through the above embodiment, the electronic device can obtain the maximum color difference value of the background pixel points in the plurality of positive sample images, and can set the maximum color difference value as the color difference threshold.

At block S13, the electronic device generates a plurality of feature connected regions of the test sample image according to the color difference threshold and the pixel difference values.

In at least one embodiment, each of the plurality of feature connected regions refer to a connected region formed by connecting adjacent target pixel points in the test sample image.

In at least one embodiment, the generating of the plurality of feature connected regions of the test sample image according to the color difference threshold and the pixel difference values includes:

Determining each pixel difference value being less than or equal to the color difference threshold as a background difference value, and selecting each pixel point corresponding to the background difference value from the test sample image as a background pixel point;

Determining each pixel difference value greater than the color difference threshold as a target difference value; selecting each pixel point corresponding to the target difference value from the test sample image as a target pixel point; generating the plurality of feature connected regions according to adjacent target pixel points.

Wherein, the pixel points in the test sample image include background pixel points and target pixel points. The background pixel points are located between any two feature connected regions.

Figure 3:
FIG. 3 is a schematic diagram showing feature connected regions generated in one embodiment of the defect detection method of the present disclosure.

As shown in FIG. 3, it is a schematic diagram of the generation of feature connected regions of one embodiment of the defect detection method of the present disclosure. When the color difference threshold equals 5, the electronic device determines each pixel difference value greater than the color difference threshold 5 as a target difference value; determines each pixel point corresponding to the target difference value in the test sample image as the target pixel point; marks each target pixel point as "1". When the pixel difference value is less than or equal to the color difference threshold 5, the electronic device determines the pixel difference value as a background difference value, and determines each pixel point corresponding to the background difference value in the test sample image as a background pixel point, and marks each background pixel point as "0". In this way, the electronic device distinguishes the target pixel points from the background pixel points in the test sample image, and generates the plurality of feature connected regions using adjacent target pixel points, the background pixel points are located between any two feature connected regions.

Through the above implementation, the background pixel points and the target pixel points in the test sample image are marked with "0" and "1" respectively, and the target pixel points are distinguished from the background pixel points, and the plurality of feature connected regions are generated via the adjacent target pixel points. Therefore, the plurality of feature connected regions in the test sample image can be accurately selected.

At block S14, the electronic device generates a first threshold according to image noises of the plurality of positive sample images.

In at least one embodiment, the electronic device determines a maximum value among the image noises of the plurality of positive sample images as the first threshold.

In at least one embodiment, the image noise may include, but is not limited to, slight color chromatic aberration, and background noise generated when the image is generated.

In at least one embodiment, the generating of the first threshold according to the image noises of the plurality of positive sample images includes:

Obtaining a plurality of background color difference value sets by setting each feature set other than the target color difference value set as the background color difference value set; from the plurality of positive sample images, determining the pixel points corresponding to the color difference values in the plurality of background color difference value sets as noise pixel points; generating a plurality of first connected regions according to adjacent noise pixel points; obtaining the image noise by counting a number of noise pixel points in each first connected region; and setting the image noise with a largest number of noise pixel points (largest image noise) as the first threshold.

Wherein, the noise pixel point refers to the pixel point in the plurality of positive sample images, and is corresponding to a color difference value of the plurality of background color difference value sets.

Through the above-mentioned implementation, the electronic device can determine the largest image noise in the plurality of positive sample images, and can set the largest image noise as the first threshold, and the electronic device can determine the target region from the plurality of feature connected regions according to the first threshold.

At block S15, the electronic device determines a target region from the plurality of feature connected regions according to the number of pixel points in each feature connected region and the first threshold.

In at least one embodiment, the target region refers to a feature connected region containing a number of pixel points greater than the first threshold.

In at least one embodiment, the determining of the target region from the plurality of feature connected regions according to the number of pixel points in each feature connected region and the first threshold includes:

Counting a number of pixel points in each feature connected region; determining the feature connected region corresponding to the number of pixel points which are greater than the first threshold as the target region.

Through the above-mentioned embodiment, the target region is selected from the plurality of feature connected regions, and the reasonable error in the test sample image can be determined, and the detection accuracy of the test sample image is improved.

At block S16, the electronic device generates a second threshold according to defective pixel points of the plurality of negative sample images.

In at least one embodiment, the electronic device determines a defect region according to a number of defective pixel points in each second connected region in the plurality of negative sample images and the first threshold, and determines a minimum value of an area of the defect region as the second threshold.

In at least one embodiment, the generating of the second threshold according to defective pixel points of the plurality of negative sample images includes:

Obtaining a third pixel value of each pixel point of each negative sample image, and obtaining a fourth pixel value of each pixel point of each positive sample image; obtaining a plurality of negative sample difference values by calculating a difference value between each third pixel value and the corresponding fourth pixel value; obtaining a plurality of feature difference values by determining each negative sample difference value being less than or equal to the color difference threshold as the feature difference value; determining each pixel point corresponding to the feature difference value from the plurality of negative sample images as a feature pixel point; determining the negative sample difference value being greater than the color difference threshold as a defect difference value; obtaining a plurality of defect pixel points by determining each pixel point corresponding to the defect difference value from the plurality of negative sample images as the defect pixel point; generating a plurality of second connected regions according to adjacent defective pixel points; counting a number of pixel points in each second connected region; determining each second connected region corresponding to the number of pixel points being greater than the first threshold as a defect region; calculating an area of each defect region, and setting a minimum area among the calculated areas as the second threshold.

Wherein, the pixel points in the plurality of negative sample images include feature pixel points and defective pixel points, and the feature pixel points are located between any two second connected regions.

In at least one embodiment, the defective pixel point refers to a pixel point corresponding to the defective difference value in the plurality of negative sample images.

In at least one embodiment, the second connected region refers to a region generated by adjacent defective pixels in the plurality of negative sample images.

In at least one embodiment, the area of defect region represents the area of the second connected region in which the number of pixel points is greater than the first threshold.

Through the above-mentioned implementation, the defect region with the minimum area in the plurality of negative sample images can be accurately obtained according to the color difference threshold and the first threshold, and the minimum area can be used as the second threshold.

At block S17, the electronic device determines a detection result of the test sample corresponding to the test sample image according to an area of the target region and the second threshold.

In at least one embodiment, the detection result indicates that the test sample includes defects or that the test sample does not include defects.

In at least one embodiment, the determining of the detection result of the test sample corresponding to the test sample image according to the area of the target region and the second threshold includes:

Obtaining an area of the target region by calculating a total number of all pixel points in the target region; determining that the test sample includes defects when the total number of all pixel points in the target region is greater than the second threshold; or determining that the test sample does not include defects when the total number of all pixel points in the target region is less than or equal to the second threshold.

Through the above embodiment, it is possible to accurately detect whether the test sample in the test sample image is a defective sample and output a corresponding detection result.

It can be seen from the above technical solutions that the electronic device calculates the first threshold based on the image noises of the plurality of positive sample images, and selects the target region from the test sample image according to the first threshold, since the target region contains reasonable errors, the second threshold determined according to the defective pixel points of the plurality of negative sample images can avoid the influence of the reasonable error in the test image on the defect detection. Thus, the detection accuracy of the test sample image can be improved.

Figure 4:
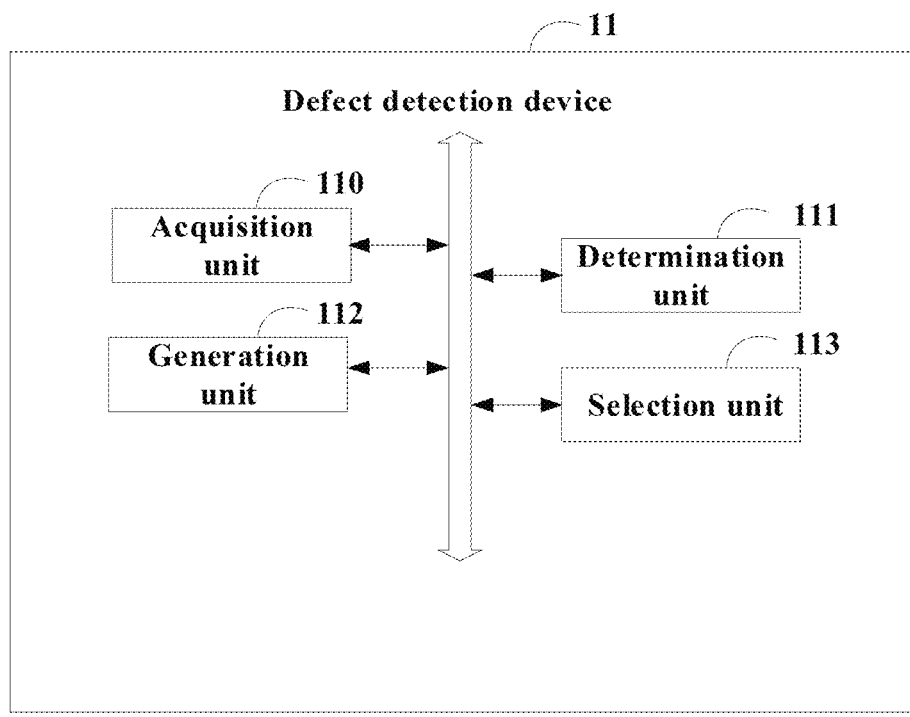
FIG. 4 is a functional block diagram of one embodiment of the defect detection device of the present disclosure.

As shown in FIG. 4, it is a block diagram of one embodiment of a defect detection device of the present disclosure. The defect detection device 11 includes an acquisition unit 110, a determination unit 111, a generation unit 112, and a selection unit 113. The modules/units referred to in this disclosure refer to a series of computer program segments that can be acquired by a processor 13 and can perform fixed functions, and are stored in a storage device 12. In this embodiment, the functions of each module/unit will be described in detail in subsequent embodiments.

The acquisition unit 110 acquires a plurality of positive sample images, a plurality of negative sample images, and a test sample image.

In at least one embodiment, each of the plurality of positive sample images is an image of a positive sample (i.e., a sample without defect). The plurality of positive sample images can be used to calculate a color difference threshold and a first threshold, and a calculation process will be described in detail below.

In at least one embodiment, each of the plurality of negative sample images is an image of a negative sample (i.e., a sample with defects). The plurality of negative sample images can be used to calculate a second threshold, and a calculation process will be described in detail below.

In at least one embodiment, the test sample image refers to an image of a test sample (i.e., a sample to be tested). By using the defect detection method, it can be determined whether the test sample is a defective sample or a non-defective sample by identifying and analyzing the test sample image.

In at least one embodiment, the sample in question may refer to a kind of product such as a computer peripheral equipment, a printed product, or any other suitable object such as a jar used for containing juice, and etc.

In at least one embodiment, the acquisition unit 110 acquires the plurality of positive sample images by controlling the camera device to capture at least one image of each of a plurality of positive samples at a position and an angle; acquires the plurality of negative sample images by controlling the camera device to capture at least one image of each of a plurality of negative samples at the position and the angle; and acquires the test sample image by controlling the camera device to capture an image of the sample to be detected at the position and angle, wherein the plurality of positive sample images, the plurality of negative sample images and the test sample image have the same shape and size.

In other words, the acquisition unit 110 can acquire the plurality of positive sample images, the plurality of negative sample images, and the test sample image by respectively controlling the camera device to capture at least one image of each of the plurality of positive samples, each of the plurality of negative samples, and the sample to be tested at the same position and angle.

Based on pixel points in the test sample image, the determination unit 111 determines corresponding pixel points in each of the plurality of positive sample images, and determines corresponding pixel difference values.

In at least one embodiment, the pixel difference value refers to a difference value between a pixel value of the pixel point in the test sample image and a pixel value of the corresponding pixel point in each of the plurality of positive sample images. That is, the pixel difference value represents a difference value between the pixel values of two corresponding pixel points. The pixel point in the test sample image and the corresponding pixel point in the positive sample image have the same position.

In at least one embodiment, the determination unit 111 determines the pixel difference value by: acquiring the pixel value of the pixel point in the test sample image as a first pixel value, and acquiring the pixel value of the corresponding pixel point in the positive sample image as a second pixel value; obtaining the pixel difference value by calculating a difference value between the first pixel value and the second pixel value.

The generation unit 112 generates a color difference threshold according to the plurality of positive sample images.

In at least one embodiment, the color difference threshold refers to a maximum number of pixel points corresponding to noise in the plurality of positive sample images, and is used to distinguish target pixel points and background pixel points in the test sample image.

In at least one embodiment, the generating of the color difference threshold according to the plurality of positive sample images includes:

Obtaining color difference values by performing a subtraction processing on pixel values of corresponding pixel points in each two positive sample images of the plurality of positive sample images; counting a number of pixel points corresponding to same color difference value in the plurality of positive sample images; generating a color difference histogram by using each color difference value as an abscissa and using the number of pixel points corresponding to the each color difference value as an ordinate; selecting a plurality of continuous color difference values from coordinate values in the color difference histogram according to a preset value (the number of pixel points corresponding to each color difference value of the continuous color difference values is greater than the preset value); obtaining a plurality of feature sets by determining continuous color difference values that are continuous with each other as a same feature set; counting a number of elements in each feature set; determining the feature set with a largest number of elements as a target color difference value set; and selecting a maximum color difference value from the target color difference value set as the color difference threshold.

Wherein, the pixel points in the plurality of positive sample images include noise pixel points and background pixel points.

The preset value can be set according to requirements, which is not limited in this application.

For example, when the preset value equals 0, the number of pixel points corresponding to color difference value 0 in the histogram equals 2, the number of pixel points corresponding to color difference value 1 equals 3, the number of pixel points corresponding to color difference value 2 equals 4, the number of pixel points corresponding to color difference value 3 equals 5, the number of pixel points corresponding to color difference value 4 equals 2, the number of pixel points corresponding to color difference value 5 equals 3, the number of pixel points corresponding to color difference value 6 equals 0, the number of pixel points corresponding to the value 7 equals 1, the number of pixel points corresponding to the color difference value 8 equals 2, the number of pixel points corresponding to the color difference value 9 equals 2, and the number of pixel points corresponding to the color difference value 10 equals 0, then the generation unit 112 obtains a feature set A={color difference value 0), color difference value 1, color difference value 2, color difference value 3, color difference value 4, color difference value 5} and obtains a feature set B={color difference value 7, color difference value 8, color difference value 9}, the number of elements contained in the feature set A is greater than the number of elements contained in the feature set B, so the generation unit 112 sets the feature set A as the target color difference value set, and determines the maximum color difference value in the feature set A i.e., the color difference value 5 as the color difference threshold.

Specifically, the coordinate value includes an ordinate value and an abscissa value, and the "selecting a plurality of continuous color difference values from coordinate values in the color difference histogram according to a preset value; obtaining a plurality of feature sets by determining continuous color difference values that are continuous with each other as a same feature set" includes:

Comparing each ordinate value with the preset value; obtaining a plurality of color difference values by selecting each abscissa value corresponding to an ordinate value that is greater than the preset value (as mentioned above, the abscissa value is the color difference value;

Obtaining a plurality of feature sets by selecting continuous color difference values that are continuous with each other from the plurality of color difference values as a same feature set.

Through the above embodiment, the generation unit 112 can obtain the maximum color difference value of the background pixel points in the plurality of positive sample images, and can set the maximum color difference value as the color difference threshold.

The generation unit 112 generates a plurality of feature connected regions of the test sample image according to the color difference threshold and the pixel difference values.

In at least one embodiment, each of the plurality of feature connected regions refer to a connected region formed by connecting adjacent target pixel points in the test sample image.

In at least one embodiment, the generating of the plurality of feature connected regions of the test sample image according to the color difference threshold and the pixel difference values includes:

Determining each pixel difference value greater than the color difference threshold as a target difference value; selecting each pixel point corresponding to the target difference value from the test sample image as a target pixel point; generating the plurality of feature connected regions according to adjacent target pixel points.

Wherein, the pixel points in the test sample image include background pixel points and target pixel points. The background pixel points are located between any two feature connected regions.

As shown in FIG. 3, it is a schematic diagram of the generation of feature connected regions of one embodiment of the defect detection method of the present disclosure. When the color difference threshold equals 5, the generation unit 112 determines each pixel difference value greater than the color difference threshold 5 as a target difference value; determines each pixel point corresponding to the target difference value in the test sample image as the target pixel point; marks each target pixel point as "1". When the pixel difference value is less than or equal to the color difference threshold 5, the generation unit 112 determines the pixel difference value as a background difference value, and determines each pixel point corresponding to the background difference value in the test sample image as a background pixel point, and marks each background pixel point as "0". In this way, the generation unit 112 distinguishes the target pixel points from the background pixel points in the test sample image, and generates the plurality of feature connected regions using adjacent target pixel points, the background pixel points are located between any two feature connected regions.

Through the above implementation, the background pixel points and the target pixel points in the test sample image are marked with "0" and "1" respectively, and the target pixel points are distinguished from the background pixel points, and the plurality of feature connected regions are generated via the adjacent target pixel points. Therefore, the plurality of feature connected regions in the test sample image can be accurately selected.

The generation unit 112 generates a first threshold according to image noises of the plurality of positive sample images.

In at least one embodiment, the generation unit 112 determines a maximum value among the image noises of the plurality of positive sample images as the first threshold.

In at least one embodiment, the image noise may include, but is not limited to, slight color chromatic aberration, and background noise generated when the image is generated.

In at least one embodiment, the generating of the first threshold according to the image noises of the plurality of positive sample images includes:

Obtaining a plurality of background color difference value sets by setting each feature set other than the target color difference value set as the background color difference value set; from the plurality of positive sample images, determining the pixel points corresponding to the color difference values in the plurality of background color difference value sets as noise pixel points; generating a plurality of first connected regions according to adjacent noise pixel points;

obtaining the image noise by counting a number of noise pixel points in each first connected region; and setting the image noise with a largest number of noise pixel points (largest image noise) as the first threshold.

Wherein, the noise pixel point refers to the pixel point in the plurality of positive sample images, and is corresponding to a color difference value of the plurality of background color difference value sets.

Through the above-mentioned implementation, the generation unit 112 can determine the largest image noise in the plurality of positive sample images, and can set the largest image noise as the first threshold, and the generation unit 112 can determine the target region from the plurality of feature connected regions according to the first threshold.

The selection unit 113 determines a target region from the plurality of feature connected regions according to the number of pixel points in each feature connected region and the first threshold.

In at least one embodiment, the target region refers to a feature connected region containing a number of pixel points greater than the first threshold.

In at least one embodiment, the determining of the target region from the plurality of feature connected regions according to the number of pixel points in each feature connected region and the first threshold includes:

Counting a number of pixel points in each feature connected region; determining the feature connected region corresponding to the number of pixel points being greater than the first threshold as the target region.

Through the above-mentioned embodiment, the target region is selected from the plurality of feature connected regions, and the reasonable error in the test sample image can be determined, and the detection accuracy of the test sample image is improved.

The generation unit 112 generates a second threshold according to defective pixel points of the plurality of negative sample images.

In at least one embodiment, the generation unit 112 determines a defect region according to a number of defective pixel points in each second connected region in the plurality of negative sample images and the first threshold, and determines a minimum value of an area of the defect region as the second threshold.

In at least one embodiment, the generating of the second threshold according to defective pixel points of the plurality of negative sample images includes:

Obtaining third pixel values of pixel points of each negative sample image, and obtaining fourth pixel values of pixel points of each positive sample image; obtaining a plurality of negative sample difference values by calculating a difference value between each third pixel value and the corresponding fourth pixel value; obtaining a plurality of feature difference values by determining each negative sample difference value being less than or equal to the color difference threshold as the feature difference value; determining each pixel point corresponding to the feature difference value from the plurality of negative sample images as a feature pixel point; determining the negative sample difference value being greater than the color difference threshold as a defect difference value; obtaining a plurality of defect pixel points by determining each pixel point corresponding to the defect difference value from the plurality of negative sample images as the defect pixel point; generating a plurality of second connected regions according to adjacent defective pixel points; counting a number of pixel points in each second connected region; determining each second connected region corresponding to the number of pixel points being greater than the first threshold as a defect region; calculating an area of each defect region, and setting a minimum area among the calculated areas as the second threshold.

Wherein, the pixel points in the plurality of negative sample images include feature pixel points and defective pixel points, and the feature pixel points are located between any two second connected regions.

In at least one embodiment, the defective pixel point refers to a pixel point corresponding to the defective difference value in the plurality of negative sample images.

In at least one embodiment, the second connected region refers to a region generated by adjacent defective pixels in the plurality of negative sample images.

In at least one embodiment, the area of defect region represents the area of the second connected region in which the number of pixel points is greater than the first threshold.

Through the above-mentioned implementation, the defect region with the minimum area in the plurality of negative sample images can be accurately obtained according to the color difference threshold and the first threshold, and the minimum area can be used as the second threshold.

The determination unit 111 determines a detection result of the test sample corresponding to the test sample image according to an area of the target region and the second threshold.

In at least one embodiment, the detection result indicates that the test sample includes defects or the test sample does not include defects.

In at least one embodiment, the determining of the detection result of the test sample corresponding to the test sample image according to the area of the target region and the second threshold includes:

Obtaining an area of the target region by calculating a total number of all pixel points in the target region; determining the test sample including defects when the total number of all pixel points in the target region is greater than the second threshold; or determining the test sample not including defects when the total number of all pixel points in the target region is less than or equal to the second threshold.

Through the above embodiment, it is possible to accurately detect whether the test sample in the test sample image is a defective sample and output a corresponding detection result.

It can be seen from the above technical solutions that the defect detection device 11 calculates the first threshold based on the image noises of the plurality of positive sample images, and selects the target region from the test sample image according to the first threshold, since the target region contains reasonable errors, the second threshold determined by according to the defective pixel points of the plurality of negative sample images can avoid the influence of the reasonable error in the test image on the defect detection. Thus, the detection accuracy of the test sample image can be improved.

Figure 5:
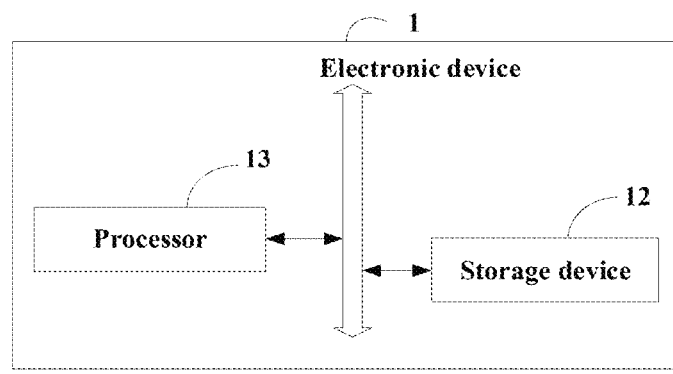
FIG. 5 is a schematic structural diagram of an electronic device of the present disclosure.

As shown in FIG. 5, it is a schematic structural diagram of an electronic device according to one embodiment of the defect detection method of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of defect detection.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device. 1.

The processor 13 obtains the operating system of the electronic device 1 and obtains various installed applications. The processor 13 obtains the application program to implement each block in the embodiments of the foregoing defect detection method, for example, implement each block shown in FIG. 2.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1. For example, the computer program can be divided into an acquisition unit 110, a determination unit 111, a generation unit 112, and a selection unit 113.

The storage device 12 can be used to store the computer programs and/or modules, and the processor 13 executes or obtains the computer programs and/or modules stored in the storage device 12, and calls the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2, the storage device 12 in the electronic device 1 stores a plurality of instructions to implement the defect detection method, and the processor 13 can acquire the plurality of instructions to implement: acquiring a plurality of positive sample images, a plurality of negative sample images, and a test sample image; based on pixel points in the test sample image, determining corresponding pixel points in each of the plurality of positive sample images, and determining corresponding pixel difference values; generating a color difference threshold according to the plurality of positive sample images; generating a plurality of feature connected regions of the test sample image according to the color difference threshold and the pixel difference values; generating a first threshold according to image noises of the plurality of positive sample images; determining a target region from the plurality of feature connected regions according to a number of pixel points in each feature connected region and the first threshold; generating a second threshold according to defective pixel points of the plurality of negative sample images; and determining a detection result of a test sample corresponding to the test sample image according to an area of the target region and the second threshold.

Specifically, for the specific implementation method of the above-mentioned instruction by the processor 13, reference may be made to the description of the relevant blocks in the corresponding embodiment of FIG. 1, and details are not described herein.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A defect detection method applied to an electronic device, the method comprising:
   acquiring a plurality of positive sample images, a plurality of negative sample images, and a test sample image;
   based on pixel points in the test sample image, determining corresponding pixel points in each of the plurality of positive sample images, and determining corresponding pixel difference values;
   generating a color difference threshold according to the plurality of positive sample images;
   generating a plurality of feature connected regions of the test sample image according to the color difference threshold and the pixel difference values;
   generating a first threshold according to image noises of the plurality of positive sample images;
   determining a target region from the plurality of feature connected regions according to a number of pixel points in each feature connected region and the first threshold;
   generating a second threshold according to defective pixel points of the plurality of negative sample images; and
   determining a detection result of a test sample corresponding to the test sample image according to an area of the target region and the second threshold.

2. The defect detection method according to claim 1, wherein the generating of the color difference threshold according to the plurality of positive sample images comprises:
   obtaining color difference values by performing a subtraction processing on pixel values of corresponding pixel points in each two positive sample images of the plurality of positive sample images;
   counting a number of pixel points corresponding to same color difference value in the plurality of positive sample images;
   generating a color difference histogram by using each color difference value as an abscissa and using the number of pixel points corresponding to the each color difference value as an ordinate;
   selecting a plurality of continuous color difference values from coordinate values in the color difference histogram according to a preset value;
   obtaining a plurality of feature sets by determining continuous color difference values that are continuous with each other as a same feature set;
   counting a number of elements in each feature set;
   determining the feature set with a largest number of elements as a target color difference value set; and
   selecting a maximum color difference value from the target color difference value set as the color difference threshold.

3. The defect detection method according to claim 2, wherein the generating of the first threshold according to the image noises of the plurality of positive sample images comprises:
   obtaining a plurality of background color difference value sets by setting each feature set other than the target color difference value set as the background color difference value set;
   from the plurality of positive sample images, determining the pixel points corresponding to the color difference values in the plurality of background color difference value sets as noise pixel points;
   generating a plurality of first connected regions according to adjacent noise pixel points;
   obtaining the image noise by counting a number of noise pixel points in each first connected region; and
   setting the image noise with a largest number of noise pixel points as the first threshold.

4. The defect detection method according to claim 1, wherein the generating of the plurality of feature connected regions of the test sample image according to the color difference threshold and the pixel difference values comprises:
   determining each pixel difference value being less than or equal to the color difference threshold as a background difference value, and selecting each pixel point corresponding to the background difference value from the test sample image as a background pixel point;
   determining each pixel difference value being greater than the color difference threshold as a target difference value;
   selecting each pixel point corresponding to the target difference value from the test sample image as a target pixel point;
   generating the plurality of feature connected regions according to adjacent target pixel points, the background pixel points being located between any two feature connected regions.

5. The defect detection method according to claim 1, wherein the determining of the target region from the plurality of feature connected regions according to the number of pixel points in each feature connected region and the first threshold comprises:
   counting a number of pixel points in each feature connected region; and
   determining the feature connected region corresponding to the number of pixel points being greater than the first threshold as the target region.

6. The defect detection method according to claim 1, wherein the generating of the second threshold according to defective pixel points of the plurality of negative sample images comprises:
   obtaining a third pixel value of each pixel point of each negative sample image, and obtaining a fourth pixel value of each pixel point of each positive sample image;
   obtaining a plurality of negative sample difference values by calculating a difference value between each third pixel value and the corresponding fourth pixel value;
   obtaining a plurality of feature difference values by determining each negative sample difference value being less than or equal to the color difference threshold as the feature difference value;

determining each pixel point corresponding to the feature difference value from the plurality of negative sample images as a feature pixel point;

determining the negative sample difference value being greater than the color difference threshold as a defect difference value;

obtaining a plurality of defect pixel points by determining each pixel point corresponding to the defect difference value from the plurality of negative sample images as the defect pixel point;

generating a plurality of second connected regions according to adjacent defective pixel points;

counting a number of pixel points in each second connected region; determining each second connected region corresponding to the number of pixel points being greater than the first threshold as a defect region;

calculating an area of each defect region, and setting a minimum area among the calculated areas as the second threshold.

7. The defect detection method according to claim 1, wherein the determining of the detection result of the test sample corresponding to the test sample image according to the area of the target region and the second threshold comprises:

obtaining an area of the target region by calculating a total number of all pixel points in the target region;

determining that the test sample comprises defects when the total number of all pixel points in the target region is greater than the second threshold; or determining that the test sample does not include defects when the total number of all pixel points in the target region is less than or equal to the second threshold.

8. An electronic device comprising:
a storage device;
at least one processor; and
the storage device storing one or more programs, which when executed by the at least one processor, cause the at least one processor to:

acquire a plurality of positive sample images, a plurality of negative sample images, and a test sample image;

based on pixel points in the test sample image, determine corresponding pixel points in each of the plurality of positive sample images, and determine corresponding pixel difference values;

generate a color difference threshold according to the plurality of positive sample images;

generate a plurality of feature connected regions of the test sample image according to the color difference threshold and the pixel difference values;

generate a first threshold according to image noises of the plurality of positive sample images;

determine a target region from the plurality of feature connected regions according to a number of pixel points in each feature connected region and the first threshold;

generate a second threshold according to defective pixel points of the plurality of negative sample images; and determine a detection result of a test sample corresponding to the test sample image according to an area of the target region and the second threshold.

9. The electronic device according to claim 8, wherein the generating of the color difference threshold according to the plurality of positive sample images comprises:

obtaining color difference values by performing a subtraction processing on pixel values of corresponding pixel points in each two positive sample images of the plurality of positive sample images;

counting a number of pixel points corresponding to same color difference value in the plurality of positive sample images;

generating a color difference histogram by using each color difference value as an abscissa and using the number of pixel points corresponding to the each color difference value as an ordinate;

selecting a plurality of continuous color difference values from coordinate values in the color difference histogram according to a preset value;

obtaining a plurality of feature sets by determining continuous color difference values that are continuous with each other as a same feature set;

counting a number of elements in each feature set;

determining the feature set with a largest number of elements as a target color difference value set; and selecting a maximum color difference value from the target color difference value set as the color difference threshold.

10. The electronic device according to claim 9, wherein the generating of the first threshold according to the image noises of the plurality of positive sample images comprises:

obtaining a plurality of background color difference value sets by setting each feature set other than the target color difference value set as the background color difference value set;

from the plurality of positive sample images, determining the pixel points corresponding to the color difference values in the plurality of background color difference value sets as noise pixel points;

generating a plurality of first connected regions according to adjacent noise pixel points;

obtaining the image noise by counting a number of noise pixel points in each first connected region; and setting the image noise with a largest number of noise pixel points as the first threshold.

11. The electronic device according to claim 8, wherein the generating of the plurality of feature connected regions of the test sample image according to the color difference threshold and the pixel difference values comprises:

determining each pixel difference value being less than or equal to the color difference threshold as a background difference value, and selecting each pixel point corresponding to the background difference value from the test sample image as a background pixel point;

determining each pixel difference value being greater than the color difference threshold as a target difference value;

selecting each pixel point corresponding to the target difference value from the test sample image as a target pixel point;

generating the plurality of feature connected regions according to adjacent target pixel points, the background pixel points being located between any two feature connected regions.

12. The electronic device according to claim 8, wherein the determining of the target region from the plurality of feature connected regions according to the number of pixel points in each feature connected region and the first threshold comprises:

counting a number of pixel points in each feature connected region; and determining the feature connected region corresponding to the number of pixel points being greater than the first threshold as the target region.

13. The electronic device according to claim 8, wherein the generating of the second threshold according to defective pixel points of the plurality of negative sample images comprises:
obtaining a third pixel value of each pixel point of each negative sample image, and obtaining a fourth pixel value of each pixel point of each positive sample image;
obtaining a plurality of negative sample difference values by calculating a difference value between each third pixel value and the corresponding fourth pixel value;
obtaining a plurality of feature difference values by determining each negative sample difference value being less than or equal to the color difference threshold as the feature difference value;
determining each pixel point corresponding to the feature difference value from the plurality of negative sample images as a feature pixel point;
determining the negative sample difference value being greater than the color difference threshold as a defect difference value;
obtaining a plurality of defect pixel points by determining each pixel point corresponding to the defect difference value from the plurality of negative sample images as the defect pixel point;
generating a plurality of second connected regions according to adjacent defective pixel points;
counting a number of pixel points in each second connected region; determining each second connected region corresponding to the number of pixel points being greater than the first threshold as a defect region;
calculating an area of each defect region, and setting a minimum area among the calculated areas as the second threshold.

14. The electronic device according to claim 8, wherein the determining of the detection result of the test sample corresponding to the test sample image according to the area of the target region and the second threshold comprises:
obtaining an area of the target region by calculating a total number of all pixel points in the target region;
determining that the test sample comprises defects when the total number of all pixel points in the target region is greater than the second threshold; or
determining that the test sample does not include defects when the total number of all pixel points in the target region is less than or equal to the second threshold.

15. A non-transitory storage medium having instructions stored thereon, when the instructions are executed by a processor of an electronic device, the processor is caused to perform a defect detection method, wherein the method comprises:
acquiring a plurality of positive sample images, a plurality of negative sample images, and a test sample image;
based on pixel points in the test sample image, determining corresponding pixel points in each of the plurality of positive sample images, and determining corresponding pixel difference values;
generating a color difference threshold according to the plurality of positive sample images;
generating a plurality of feature connected regions of the test sample image according to the color difference threshold and the pixel difference values;
generating a first threshold according to image noises of the plurality of positive sample images;
determining a target region from the plurality of feature connected regions according to a number of pixel points in each feature connected region and the first threshold;
generating a second threshold according to defective pixel points of the plurality of negative sample images; and
determining a detection result of a test sample corresponding to the test sample image according to an area of the target region and the second threshold.

16. The non-transitory storage medium according to claim 15, wherein the generating of the color difference threshold according to the plurality of positive sample images comprises:
obtaining color difference values by performing a subtraction processing on pixel values of corresponding pixel points in each two positive sample images of the plurality of positive sample images;
counting a number of pixel points corresponding to same color difference value in the plurality of positive sample images;
generating a color difference histogram by using each color difference value as an abscissa and using the number of pixel points corresponding to the each color difference value as an ordinate;
selecting a plurality of continuous color difference values from coordinate values in the color difference histogram according to a preset value;
obtaining a plurality of feature sets by determining continuous color difference values that are continuous with each other as a same feature set;
counting a number of elements in each feature set;
determining the feature set with a largest number of elements as a target color difference value set; and
selecting a maximum color difference value from the target color difference value set as the color difference threshold.

17. The non-transitory storage medium according to claim 16, wherein the generating of the first threshold according to the image noises of the plurality of positive sample images comprises:
obtaining a plurality of background color difference value sets by setting each feature set other than the target color difference value set as the background color difference value set;
from the plurality of positive sample images, determining the pixel points corresponding to the color difference values in the plurality of background color difference value sets as noise pixel points;
generating a plurality of first connected regions according to adjacent noise pixel points;
obtaining the image noise by counting a number of noise pixel points in each first connected region; and
setting the image noise with a largest number of noise pixel points as the first threshold.

18. The non-transitory storage medium according to claim 15, wherein the generating of the plurality of feature connected regions of the test sample image according to the color difference threshold and the pixel difference values comprises:
determining each pixel difference value being less than or equal to the color difference threshold as a background difference value, and selecting each pixel point corresponding to the background difference value from the test sample image as a background pixel point;
determining each pixel difference value being greater than the color difference threshold as a target difference value;

selecting each pixel point corresponding to the target difference value from the test sample image as a target pixel point;

generating the plurality of feature connected regions according to adjacent target pixel points, the background pixel points being located between any two feature connected regions.

19. The non-transitory storage medium according to claim 15, wherein the determining of the target region from the plurality of feature connected regions according to the number of pixel points in each feature connected region and the first threshold comprises:

counting a number of pixel points in each feature connected region; and determining the feature connected region corresponding to the number of pixel points being greater than the first threshold as the target region.

20. The non-transitory storage medium according to claim 15, wherein the generating of the second threshold according to defective pixel points of the plurality of negative sample images comprises:

obtaining a third pixel value of each pixel point of each negative sample image, and obtaining a fourth pixel value of each pixel point of each positive sample image;

obtaining a plurality of negative sample difference values by calculating a difference value between each third pixel value and the corresponding fourth pixel value;

obtaining a plurality of feature difference values by determining each negative sample difference value being less than or equal to the color difference threshold as the feature difference value;

determining each pixel point corresponding to the feature difference value from the plurality of negative sample images as a feature pixel point;

determining the negative sample difference value being greater than the color difference threshold as a defect difference value;

obtaining a plurality of defect pixel points by determining each pixel point corresponding to the defect difference value from the plurality of negative sample images as the defect pixel point;

generating a plurality of second connected regions according to adjacent defective pixel points;

counting a number of pixel points in each second connected region; determining each second connected region corresponding to the number of pixel points being greater than the first threshold as a defect region;

calculating an area of each defect region, and setting a minimum area among the calculated areas as the second threshold.

* * * * *